(12) United States Patent
Ooyama et al.

(10) Patent No.: US 10,113,851 B2
(45) Date of Patent: Oct. 30, 2018

(54) PROBE HEAD ROTATING MECHANISM

(71) Applicant: MITUTOYO CORPORATION, Kanagawa (JP)

(72) Inventors: Yoshikazu Ooyama, Moka (JP); Hayato Kusama, Kanuma (JP); Sadayuki Matsumiya, Sagamihara (JP); Hitoshi Ohta, Kawasaki (JP)

(73) Assignee: MITUTOYO CORPORATION, Kanagawa (JP)

( * ) Notice: Subject to any disclaimer, the term of this patent is extended or adjusted under 35 U.S.C. 154(b) by 141 days.

(21) Appl. No.: 15/241,627

(22) Filed: Aug. 19, 2016

(65) Prior Publication Data
US 2017/0059297 A1 Mar. 2, 2017

(30) Foreign Application Priority Data
Aug. 27, 2015 (JP) ................................. 2015-168258

(51) Int. Cl.
*G01B 5/012* (2006.01)
*G01B 5/00* (2006.01)
*G01B 7/00* (2006.01)

(52) U.S. Cl.
CPC ........... *G01B 5/012* (2013.01); *G01B 5/0014* (2013.01); *G01B 7/001* (2013.01)

(58) Field of Classification Search
CPC ....... G01B 5/012; G01B 5/0014; G01B 7/001
USPC ................................................. 33/556, 559
See application file for complete search history.

(56) References Cited

U.S. PATENT DOCUMENTS

| 4,503,616 | A | * | 3/1985 | Pullen | G01B 7/001 33/558 |
| 4,631,834 | A | * | 12/1986 | Hayashi | G01B 5/008 33/1 M |
| 4,805,314 | A | * | 2/1989 | Hayashi | G01B 7/008 33/1 M |
| 5,979,070 | A | * | 11/1999 | Lau | G01B 5/012 33/503 |
| 7,213,344 | B2 | * | 5/2007 | Jordil | G01B 5/012 33/556 |

(Continued)

FOREIGN PATENT DOCUMENTS

| DE | 102007022326 | 11/2008 |
| GB | 2037436 | 7/1980 |
| JP | H03-504278 | 9/1991 |

OTHER PUBLICATIONS

Search Report issued in EPO Patent Application No. 16183992.3, dated Nov. 4, 2016.

(Continued)

*Primary Examiner* — R. A. Smith
*Assistant Examiner* — Tania Courson
(74) *Attorney, Agent, or Firm* — Greenblum & Bernstein, P.L.C.

(57) ABSTRACT

A probe head rotation mechanism, situated between a spindle and a probe of a coordinate measurement device, includes: a main body frame supported by the spindle; a rotor supported by the main body frame so as to be capable of tilting with respect to an axial center of the spindle; the main body frame; and a motor supported by the main body frame and driving the rotor. A motor main body is arranged away from lying on the axial center of the spindle, and an axial center of the motor is oriented outward in a diameter direction of the spindle.

11 Claims, 6 Drawing Sheets

(56) References Cited

U.S. PATENT DOCUMENTS

| | | | | |
|---|---|---|---|---|
| 7,263,780 B2* | 9/2007 | Jordil | .................... | G01B 5/012 33/556 |
| 7,415,775 B2* | 8/2008 | Jordil | .................... | G01B 5/012 33/556 |
| 7,861,430 B2* | 1/2011 | Jonas | .................. | G01B 21/045 33/503 |
| 7,882,644 B2* | 2/2011 | Kawabata | .............. | G01B 5/012 33/556 |
| 8,006,399 B2* | 8/2011 | Wallace | ................ | G01B 7/012 33/503 |
| 8,468,672 B2* | 6/2013 | Wallace | ................ | G01B 5/012 29/407.06 |
| 8,627,576 B2* | 1/2014 | Engel | .................. | G01B 21/047 33/503 |
| 9,377,284 B2* | 6/2016 | McMurtry | ............ | G01B 5/012 |
| 9,719,769 B2* | 8/2017 | Takanashi | .............. | G01B 7/001 |
| 9,903,713 B2* | 2/2018 | Featherstone | .......... | G01B 5/012 |
| 2009/0031575 A1* | 2/2009 | Tomelleri | .............. | G01B 7/012 33/561 |
| 2015/0292851 A1* | 10/2015 | Yamamoto | ............ | G01B 3/008 33/503 |
| 2017/0059296 A1* | 3/2017 | Chang | .................... | G01D 11/30 |

OTHER PUBLICATIONS

Search Report issued in European Patent Office (EPO) Patent Application No. 16183992.3, dated Nov. 4, 2016.

\* cited by examiner

PROBE HEAD ROTATING MECHANISM

CROSS-REFERENCE TO RELATED APPLICATIONS

The present application claims priority under 35 U.S.C. § 119 of Japanese Application No. 2015-168258, filed on Aug. 27, 2015, the disclosure of which is expressly incorporated by reference herein in its entirety.

BACKGROUND OF THE INVENTION

1. Field of the Invention

The present invention relates to a probe head rotation mechanism, and in particular relates to a probe head rotation mechanism capable of reducing an error in a defined position of the probe by reducing an effect on a probe of heat generated by a drive source due to changing a posture of the probe.

2. Description of Related Art

Conventionally, a probe head rotation mechanism has been used, such as that disclosed in Japanese Unexamined Patent Publication No. H03-504278, which modifies a posture of a probe of a computer numerical control (CNC) coordinate measurement device. The probe head rotation mechanism is arranged between a spindle and the probe in the coordinate measurement device and is capable of tilting the probe with respect to an axial center of the spindle. By tilting, the posture of the probe can be optimized for measuring a complex work piece shape.

However, in the probe head rotation mechanism disclosed in Japanese Unexamined Patent Publication No. H03-504278, a motor main body (main body of a drive source) of a motor (drive source) modifying the posture of the probe is arranged on the axial center of the spindle. Therefore, thermal expansion of the motor due to heat generated when the motor is driven may directly lead to an error in a defined position of the probe.

SUMMARY OF THE INVENTION

In order to resolve this issue, the present invention provides a probe head rotation mechanism capable of reducing an error in a defined position of a probe by reducing an effect on the probe of heat generated by a drive source due to changing a posture of the probe.

One aspect of the present invention is a probe head rotation mechanism situated between a spindle and a probe of a coordinate measurement device, the probe head rotation mechanism including: a main body frame supported by the spindle; a rotating body supported by the main body frame so as to be capable of tilting with respect to an axial center of the spindle; and a drive source supported by the main body frame and driving the rotating body. A main body of the drive source is arranged away from lying on the axial center of the spindle, and an axial center of the drive source is oriented outward in a diameter direction of the spindle.

According to another aspect of the present invention, a casing of the drive source projects further outward in the diameter direction than the spindle.

According to another aspect of the present invention, a heat buffering structure absorbing thermal conduction from the drive source to the rotating body is provided to at least a portion of an area between the drive source and the rotating body.

According to another aspect of the present invention, the heat buffering structure includes a layer of air.

According to another aspect of the present invention, the heat buffering structure further includes a thermal insulation member situated between the casing of the drive source and the main body frame, the thermal insulation member supporting the casing of the drive source.

According to another aspect of the present invention, the heat buffering structure further includes a shaft coupling a drive shaft of the drive source and a rotary shaft of the rotating body.

According to another aspect of the present invention, the rotary shaft of the rotating body and the axial center of the spindle are further arranged orthogonally to each other.

According to another aspect of the present invention, the probe head rotation mechanism further includes an air cylinder mechanism positioning the rotating body.

According to another aspect of the present invention, the air cylinder mechanism is arranged opposite the rotating body, on an opposite side of the axial center of the spindle from the probe.

According to another aspect of the present invention, the air cylinder mechanism includes a cylinder member fixated to the main body frame, and a piston member fitted into the cylinder member and capable of displacement in the axis direction of the spindle via compressed air introduced into the cylinder member. The piston member includes a positioning pin capable of coupling to the piston member and displacing in the axis direction of the spindle. A ball is provided to a forefront end of the positioning pin, and the rotating body includes a positioning block having a pair of circular column members corresponding to a predetermined tilt angle of the rotating body and capable of touching the ball. An axis direction of the circular column members is configured to match an axis direction of the rotary shaft of the rotating body.

According to another aspect of the present invention, the positioning pin is provided to the piston member and is supported by the main body frame via a ball spline bearing.

According to another aspect of the present invention, the rotary shaft of the rotating body is fitted into a through-hole provided to the rotating body and regulates displacement of the rotating body relative to the axis direction of the rotary shaft using a large diameter portion provided at a position corresponding to a first hole end portion of the through-hole and a shim arranged at a position corresponding to a second hole end portion of the through-hole. In addition, a pair of bearings positioned on an exterior of the large diameter portion and the shim, respectively, are fixated to the main body frame by applying pressure in mutually facing directions and the rotary shaft is supported by the main body frame via the pair of bearings.

With the present invention, an error in a defined position of a probe can be reduced by reducing an effect on the probe of heat generated by a drive source due to changing a posture of the probe.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Hereafter, an exemplary first embodiment of the present invention is described in detail with reference to FIGS. 1 to 4B.

Initially, a coordinate measurement device is described in overview.

Figure 1:
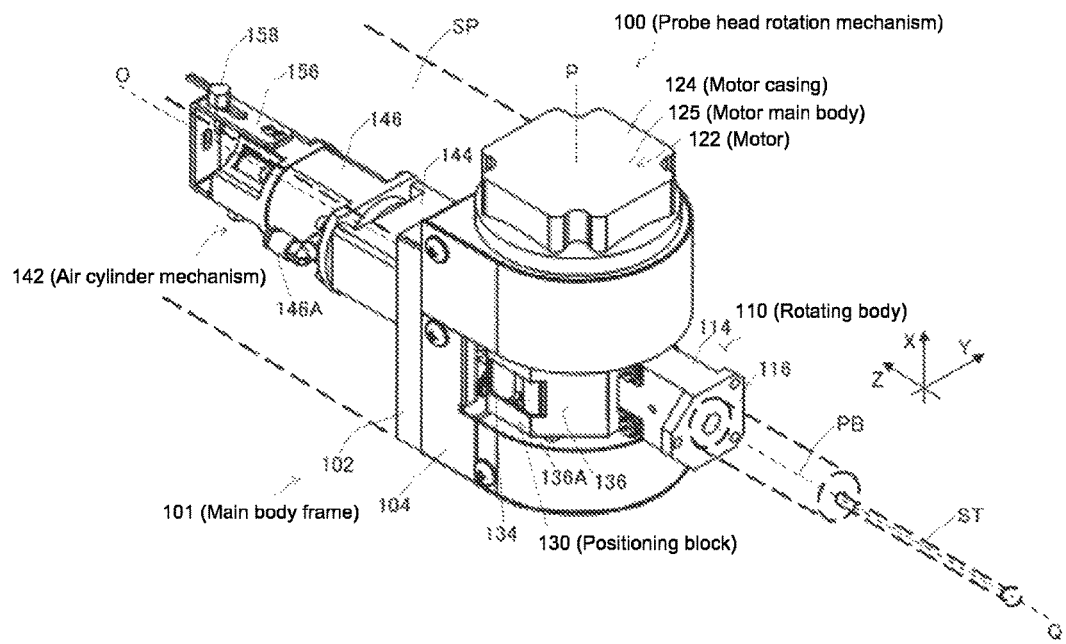
FIG. 1 is a perspective view of an exemplary probe head rotation mechanism according to a first embodiment of the present invention.

The coordinate measurement device, for example, is capable of measuring a three-dimensional shape of a measured object resting on a base, using a probe PB supported by a probe head rotation mechanism 100 on a spindle SP, which is capable of displacing in X, Y, and Z directions above the base (specifically, the probe head rotation mechanism 100 is situated between the spindle SP and the probe PB of the coordinate measurement device). In FIG. 1, the probe PB includes a stylus ST which touches the measured object to detect the shape of the measured object (in FIG. 1, the spindle SP, probe PB, and stylus ST are each shown in schematic form by dashed lines). In the present embodiment, an axis direction O of the spindle SP is defined as downward in a vertical direction (Z direction). However, the axis direction O may instead be oriented in a horizontal direction, or may be defined as upward in the vertical direction (Z direction).

Next, the probe head rotation mechanism is described with reference to FIGS. 1 to 4A and 4B.

As shown in FIG. 1, the probe head rotation mechanism 100 includes a main body frame 101, a rotating body (also referred to as a rotor) 110, a motor (drive source) 122, and an air cylinder mechanism (also referred to as an air cylinder) 142.

Figure 3A:
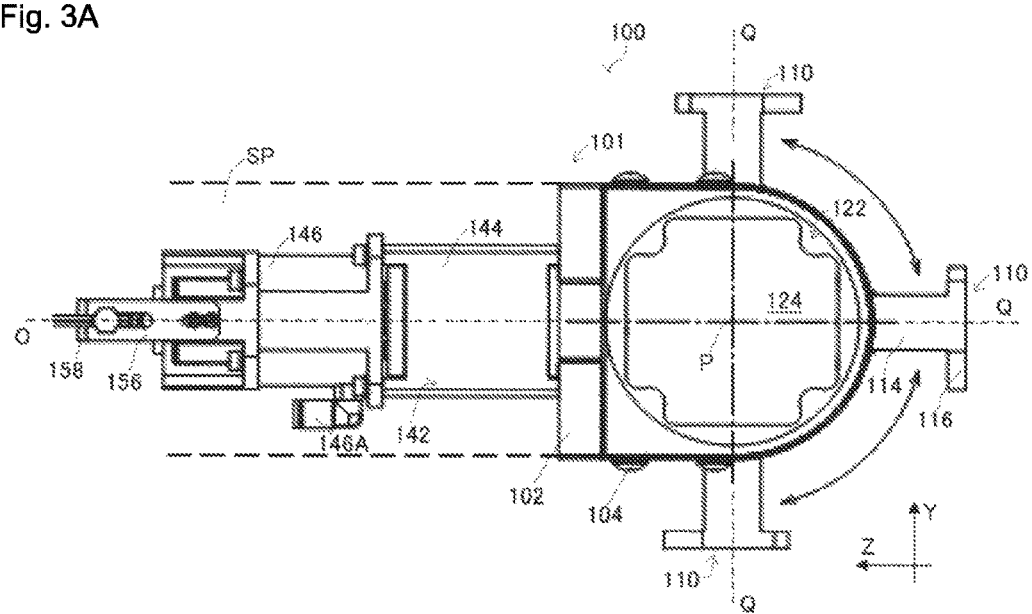
FIGS. 3A and 3B are schematic views of the probe head rotation mechanism of FIG. 1 (FIG. 3A shows a front view and FIG. 3B shows a left view)
Figure 4A:
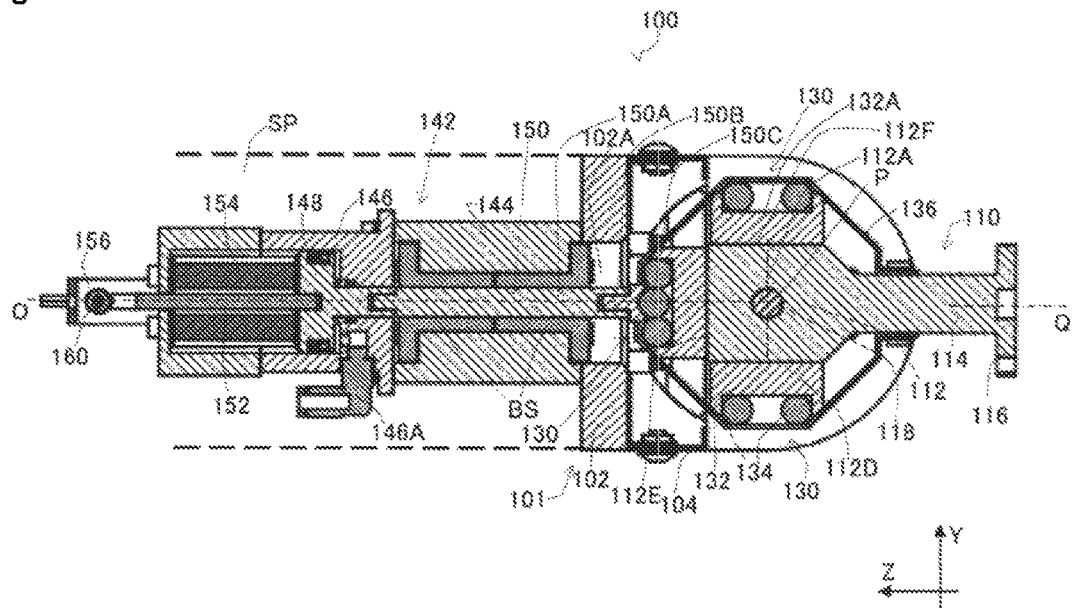
FIGS. 4A and 4B are schematic views of the probe head rotation mechanism of FIG. 1 (FIG. 4A shows a front cross-sectional view and FIG. 4B shows a left cross-sectional view)
Figure 4B:
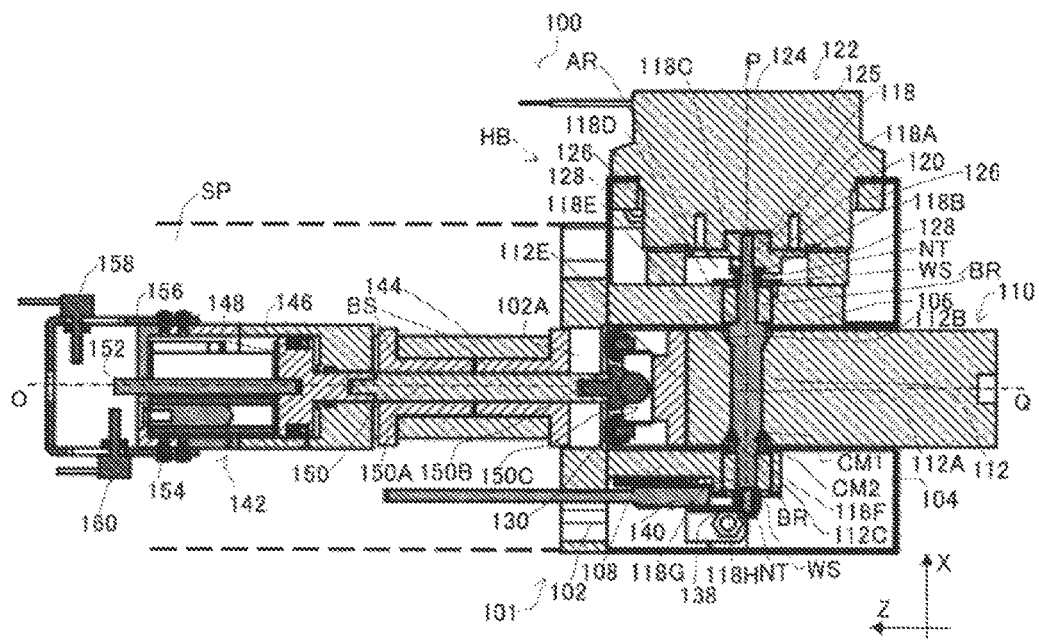

As shown in FIG. 1, the main body frame 101 is supported on the spindle SP. As shown in FIG. 4B, the main body frame 101 includes a flange body 102, a pair of frame bodies 106 and 108, and a support member 144. The flange body 102 is a member fixated to an end portion of the spindle SP, and a through-hole 102A is provided at the center of the flange body 102. The pair of frame bodies 106 and 108 are each fixated to one side surface of the flange body 102, on opposite sides of the through-hole 102A. A through-hole is provided to each of the pair of frame bodies 106 and 108, and a bearing (for example, a combined angular bearing) BR is provided on an interior of each through-hole. In addition, the pair of frame bodies 106 and 108 are rotatably supported via the bearings BR such that a rotary shaft 118 (described below) is orthogonal to the axis direction O of the spindle SP. Also, as shown in FIG. 3A, the flange body 102 supports the tubular support member 144 on a second side surface. A main body cover 104 is provided so as to cover the pair of frame bodies 106 and 108.

As shown in FIG. 1, the rotating body 110 is supported by the main body frame 101 so as to be capable of tilting with respect to an axial center O of the spindle SP. In other words, the axial center O of the spindle SP and an axial center Q of the probe PB, which is supported by the rotating body 110, are configured to lie in the same direction. At the same time, the axial center O of the spindle SP and an axial center P of the rotary shaft 118 are configured to be orthogonal to each other. As shown in FIG. 4A, the rotating body 110 integrally includes a base portion 112, a stem 114, and an attachment portion 116. As shown in FIGS. 4A and 4B, a through-hole 112A is provided to the base portion 112, and hole end portions 112B and 112C are configured with a larger interior diameter than the portion of the through-hole 112A lying between the hole end portions 112B and 112C. In addition, three lateral surfaces 112D, 112E, and 112F are formed equidistant from a center axis of the through-hole 112A (axial center P of the rotary shaft 118 fitted into the through-hole 112A). In the present embodiment, in order to fixate the probe PB to the axial center O of the spindle SP at inclinations of 90°, 0°, and −90°, the lateral surface 112D and lateral surface 112E are formed so as to intersect orthogonally, and the lateral surface 112E and lateral surface 112F are formed so as to intersect orthogonally. In addition, a positioning block 130 is arranged on each of the three lateral surfaces 112D, 112E, and 112F. While the lateral surfaces 112D, 112E, and 112F are thus provided to three sides surrounding the through-hole 112A, the stem 114 is integrally provided to a fourth side. In addition, the attachment portion 116 is integrally provided to a forefront end of the stem 114. The probe PB is attached to the attachment portion 116.

As shown in FIG. 4B, the rotary shaft 118 is fitted into and fixated to the through-hole 112A. The rotary shaft 118 is an axially symmetric, pole-shaped member which integrally includes a coupling portion 118A, threaded portions 118B and 118H, support portions 118C and 118G, a large diameter portion 118D, an insertion engagement portion 118E, and a pressing portion 118F.

As shown in FIG. 4B, the coupling portion 118A is coupled to a motor shaft (drive shaft) of the motor 122 via a shaft coupling 120. The threaded portions 118B and 118H are each portions threadably mounted with a nut NT. The support portions 118C and 118G are each portions supported by the bearing BR. The large diameter portion 118D is provided at a position corresponding to the hole end portion 112B of the rotating body 110 and is configured to have a larger diameter than the insertion engagement portion 118E. The pressing portion 118F is provided at a position corresponding to the hole end portion 112C and is configured to have a smaller diameter than the insertion engagement portion 118E.

As shown in FIG. 4B, a shim CM1 having a circular cross-section and a shim CM2 having a quadrangular cross-section are arranged on the pressing portion 118F (in other words, the shims CM1 and CM2 are provided at a position on the rotating body 110 corresponding to the hole end portion 112C). Therefore, by applying a force on the shims CM1 and CM2 from an exterior (force toward the large diameter portion 118D), displacement of the rotating body 110 relative to the axis direction P of the rotary shaft 118 can be regulated. The shims CM1 and CM2 are configured to receive force from an inner ring of the bearing BR positioned on the frame body 108 and supporting the support portion 118G. The inner ring of the bearing BR is configured to receive, via a washer WS, force from the nut NT, which is threadably mounted on the threaded portion 118H. In other words, force on the shims CM1 and CM2 can be adjusted by a threading state of the nut NT.

Also, as shown in FIG. 4B, an outer ring of the bearing BR supporting the support portion 118G is also pressed and fixated to the frame body 108 by a screw or the like (not shown in the drawings). Meanwhile, the inner ring of the bearing BR, which is positioned outside the large diameter portion 118D, is configured to receive force, via the washer WS, from the nut NT which is threadably mounted on the threaded portion 118B. In addition, the outer ring of the bearing BR supporting the support portion 118C is also pressed and fixated to the frame body 106 by a screw or the like (not shown in the drawings). Specifically, the pair of bearings BR, positioned on the exterior of the large diameter portion 118D and the shims CM1 and CM2, respectively, are fixated to the main body frame 101 by applying pressure (pressure from the exterior side) with the nuts NT in mutually facing directions. In addition, the rotary shaft 118 is supported by the main body frame 101 via the pair of bearings BR.

As shown in FIG. 4B, a rotating plate 138 having a non-circular shape, for example, is asymmetrically fixated to the rotary shaft 118 by the nut NT threadably mounted to the threaded portion 118H. In this example, a proximity sensor 140 is provided between the rotating plate 138 and the frame body 108 in the X direction. At this point, a rotation angle of the rotary shaft 118 where the rotating plate 138 is in closest contact to the proximity sensor 140, for example, is associated with the positions of each of the positioning blocks 130. Doing this results in detection of the rotating plate 138 by the proximity sensor 140, and enables detection of a tilt angle of the rotating body 110 that is to be set in position by the positioning blocks 130. The proximity sensor 140 may also directly detect the tilt angle of the rotating body 110 by configuring a rotary encoder.

Figure 3B:
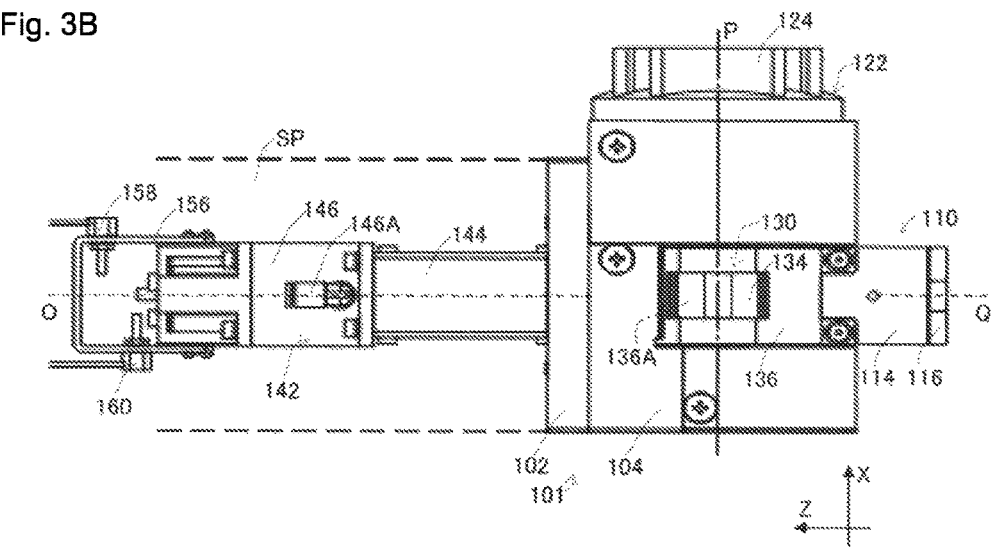

As shown in FIG. 1, the motor 122 is supported on the main body frame 101 and drives the rotating body 110. The motor 122 includes a motor casing (drive source casing) 124, a motor main body (drive source main body) 125, and a motor shaft (not shown in the drawings). The motor casing 124 houses the motor main body 125 and, as shown in FIGS. 3B and 4B, projects further outward in a diameter direction than the spindle SP.

As shown in FIG. 4B, the motor casing 124 is supported by an annular thermal insulation member (also referred to as an insulator) 126, which is supported on the main body cover 104, and an annular thermal insulation member (also referred to as an insulator) 128, which is situated on the frame body 106. In other words, this may be a configuration in which a heat buffering structure HB absorbing thermal conduction from the motor 122 to the rotating body 110 is provided between the motor 122 and the rotating body 110. Specifically, the heat buffering structure HB is a configuration arranged between the motor casing 124 and the main body frame 101, and includes the thermal insulation members 126 and 128 which support the motor casing 124. The thermal insulation members 126 and 128 can be configured by a metal, ceramic, or resin having low thermal conductivity, for example. In addition, a layer of air AR is provided between the frame body 106 and the motor casing 124. The layer of air AR has a higher thermal insulation performance than resin, for example. In other words, the heat buffering structure HB may have a configuration that includes the layer of air AR.

The motor main body 125 includes a rotor and stator (not shown in the drawings) of the motor 122. The motor shaft is coupled to the rotor, and the motor shaft is coupled to the rotary shaft 118 by the shaft coupling 120. Specifically, the motor main body 125 is positioned away from lying on the axial center O of the spindle SP. In addition, the axial center of the motor 122 (axial center P of the rotary shaft 118) is in a state oriented outward in the diameter direction of the spindle SP. In this example, the shaft coupling 120 has a diameter larger than that of the motor shaft and rotary shaft 118, and includes a plurality of protrusions and recesses on its face. Therefore, the shaft coupling 120 can achieve heat dispersion (in other words, a configuration where the heat buffering structure HB includes the shaft coupling 120, which connects the motor shaft of the motor 122 with the rotary shaft 118 of the rotating body 110).

Figure 2:
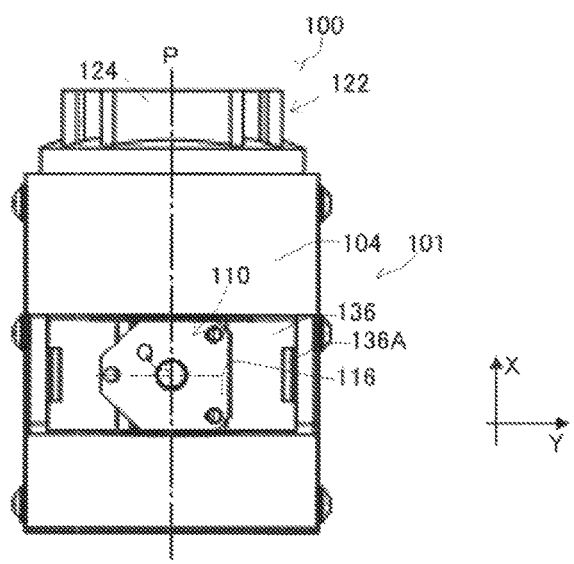
FIG. 2 is a bottom view of the probe head rotation mechanism of FIG. 1.

As shown in FIGS. 4A and 4B, the positioning blocks 130 include a base member 132 and a circular column member (also referred to as a shaft or roller) 134. The base member 132 includes a recess 132A on a front surface (see FIG. 4A) and is configured with a flat rear surface. The rear surface is provided so as to be in contact with the lateral surface 112D (112E or 112F), and a pair of the circular column members 134 are provided to the recess 132A on the front surface (specifically, a configuration in which the positioning block 130, which includes the pair of circular column members 134, is provided to the rotating body 110 in accordance with a predetermined tilt angle of the rotating body 110). In addition, the axis direction of the pair of circular column members 134 is identical to the axis direction P of the rotary shaft 118 of the rotating body 110. Also, as shown in FIGS. 2 and 3B, an outer circumference of the three positioning blocks 130 is covered by a single block cover 136, the block cover 136 including an opening 136A enabling a positioning pin 150 (described later) to abut the pair of circular column members 134. Therefore, the block cover 136 is capable of blocking dust and preventing detachment of the positioning blocks 130, for example.

As shown in FIG. 1, the air cylinder mechanism 142 is supported on the support member 144 (in other words, the air cylinder mechanism 142 is arranged opposite the rotating body 110, on an opposite side of the axial center O of the spindle SP from the probe). The air cylinder mechanism 142 includes a cylinder member 146 and a piston member (also referred to as a piston) 148 (shown in FIGS. 4A and 4B). The cylinder member 146 is fixated to the support member 144 of the main body frame 101. The cylinder member 146 includes an air splice 146A, which introduces compressed air to displace the piston member 148. The piston member 148 is fitted into the cylinder member 146 and is capable of displacement in the axis direction O of the spindle SP via the compressed air introduced into the cylinder member 146. A coil spring 154 (FIGS. 4A and 4B) is situated at a rear end portion of the piston member 148. Therefore, when entering a state where the compressed air is introduced into the cylinder member 146, the coil spring 154 is compressed and the piston member 148 displaces in the +Z direction. When entering a state where the compressed air is not introduced into the cylinder member 146, the piston member 148 is configured to displace in the −Z direction due to the coil spring 154. Using the coil spring 154, a defined position of the probe PB can be prevented from changing due to a moment generated by acceleration or deceleration during measurement of the measured object. In addition, a through-hole is provided to the cylinder member 146 along the axial center O of the spindle SP. The positioning pin 150 provided to the front end portion of the piston member 148 is positioned in this through-hole. Specifically, in a configuration where the piston member 148 includes the positioning pin 150, which is capable of coupling to the piston member 148 and displacing in the axis direction O of the spindle SP. Moreover, a positioning mechanism includes the positioning blocks 130, the air cylinder mechanism 142, and the positioning pin 150.

As shown in FIGS. 4A and 4B, the positioning pin 150 includes a rod portion 150A, a holding portion 150B, and a ball 150C. The rod portion 150A is coupled to the piston member 148, and is supported on the support member 144 via ball spline bearings BS arranged serially on the axis direction O of the spindle SP (in other words, the positioning pin 150 is provided to the piston member 148 and is supported on the main body frame 101 via the ball spline bearings BS). The holding portion 150B is a member provided to a forefront end of the rod portion 150A, and holds and fixates the ball 150C (in other words, a configuration where the ball 150C is provided to the forefront end of the positioning pin 150). The ball 150C makes contact with and separates from the pair of circular column members 134 of the positioning blocks 130 in association with displacement of the piston member 148 (in other words, the probe head rotation mechanism 100 is configured to include the air cylinder mechanism 142 in positioning the rotating body 110).

In addition, as shown in FIGS. 4A and 4B, a pole member 152 is integrally provided to the rear end portion of the piston member 148. Also, a through-hole is provided to the rear end surface of the cylinder member 146, which is configured so that the pole member 152 passes through the through-hole. End portions of a sensor support member 156 having a squared bracket shape are respectively fixated to two lateral surfaces of the cylinder member 146. Fiber sensors 158 and 160 are fixated to the sensor support member 156, the fiber sensors 158 and 160 detecting the position of the pole member 152, which displaces in the axis direction O of the spindle SP. The fiber sensor 158 is arranged further away from the rear end surface of the cylinder member 146 than is the fiber sensor 160. For example, when the pole member 152 is detected with the fiber sensors 158 and 160 (specifically, when the fiber sensors 158 and 160 are blocked by the pole member 152), the ball 150C is in a sufficiently withdrawn state. Accordingly, a determination can be made that an inclined posture of the rotating body 110 is in a modifiable state. In addition, when the pole member 152 is not detected by the fiber sensors 158 and 160, the ball 150C is in a state sufficiently pressed into a positioning block 130. Accordingly, a determination can be made that the inclined posture of the rotating body 110 is not in a modifiable state.

Next, operations of the probe head rotation mechanism 100 are described. This example imagines a state where the positioning pin 150 is sufficiently pressed into a positioning block 130, and that the rotating body 110 is tilted 90° from a 0° state.

First, compressed air is supplied from the air splice 146A to an interior of the cylinder member 146 and the cylinder member 146 is displaced in the +Z direction. Then, when the presence of the pole member 152 is detected by the two fiber sensors 158 and 160, the motor 122 is driven.

The rotating plate 138 is rotated by the drive of the motor 122, and when the proximity sensor 140 detects a tilt angle of 90°, the motor 122 is stopped.

Then, the supply of the compressed air to the air splice 146A is stopped, the compressed air is leaked, and pressure on the interior of the cylinder member 146 is reduced.

When this occurs, the cylinder member 146 is displaced in the −Z direction by the force of the coil spring 154. Then, when the two fiber sensors 158 and 160 are no longer able to detect the presence of the pole member 152, definition of the tilt angle of the rotating body 110 by the positioning pin 150 ends.

In this way, the probe head rotation mechanism 100 according to the present embodiment has a simple structure which includes a mechanism enabling inclination around one axis (the rotary shaft 118) and a corresponding positioning mechanism. Therefore, the probe head rotation mechanism 100 according to the present embodiment can be manufactured at a lower cost than a probe head rotation mechanism disclosed in the background art. Specifically, when a measurement region is more restricted than in the conventional art, the probe head rotation mechanism 100 of the present embodiment can be used instead of the probe head rotation mechanism disclosed in the background art, and costs associated with measurement can be kept lower than in the conventional art.

Also, in the present embodiment, the motor main body 125 is positioned away from lying on the axial center O of the spindle SP. Therefore, fluctuations in position (due to thermal expansion) along the axis direction Q of the probe PB due to heat generated by the motor 122 can be reduced. In addition, because the axial center of the motor 122 is oriented toward a diameter direction exterior, the heat of the motor 122 is readily released toward the diameter direction exterior. Also, the position of the probe PB does not change even when the motor 122 is swapped out, and therefore calculation of the defined position of the probe PB is facilitated. Moreover, the present invention is not limited to this, and the axial center of the drive source may instead not be oriented outward in the diameter direction of the spindle SP, for example.

In addition, in the present embodiment, the motor casing 124 projects further toward the diameter direction exterior than the spindle SP. In other words, the heat of the motor 122 is readily dispersed to the exterior of the spindle SP by the motor casing 124, and heat transmitted to the axial center O of the spindle SP can be further reduced. Specifically, fluctuations in position along the axis direction Q of the probe PB due to heat can be further reduced. Moreover, the present invention is not limited to this, and the motor casing may instead be provided further toward the diameter direction interior than the spindle SP.

In the present embodiment, the heat buffering structure HB, which absorbs thermal conduction from the motor 122 to the rotating body 110, is provided between the motor 122 and the rotating body 110. Examples of the heat buffering structure HB may include the layer of air AR, the thermal insulation members 126 and 128, and the shaft coupling 120. Therefore, heat produced by the motor 122 is absorbed with the heat buffering structure HB, and as a result the heat transmitted to the axial center O of the spindle SP can be still further reduced. Specifically, fluctuations in position along the axis direction Q of the probe PB due to heat can be still further reduced. Moreover, the present invention is not limited to this, and the heat buffering structure HB may instead be provided to at least a portion of the area between the motor and the rotating body. In addition, the heat buffering structure HB does not necessarily include the layer of air AR, the thermal insulation members, or the shaft coupling, and may instead include some other element. Alternatively, the heat buffering structure HB may be omitted.

Furthermore, in the present embodiment, the rotary shaft 118 of the rotating body 110 and the axial center O of the spindle SP are arranged to be orthogonal to each other. This facilitates matching the axial center Q of the probe PB to the axial center O of the spindle SP. Specifically, even when the probe PB is inclined, the position of the forefront end of the probe PB is readily calculated. Moreover, the present invention is not limited to this, and the rotary shaft of the rotating body and the axial center O of the spindle SP may instead not be arranged so as to be orthogonal to each other.

Still further, the present embodiment includes the air cylinder mechanism 142 for positioning the rotating body 110. In principle, operation of the air cylinder generates no heat, and positional errors due to heat can be prevented. Moreover, compressed air is typically supplied to an area around a coordinate measurement device by a pipe, and therefore a compressed air pipe can be readily redirected and used. Moreover, the present invention is not limited to this, and the air cylinder mechanism may instead not be provided for positioning the rotating body.

Also, in the present embodiment, the air cylinder mechanism 142 is arranged opposite the rotating body 110, on an opposite side of the axial center O of the spindle SP from the probe. Therefore, an increase in diameter and increase in weight of the positioning mechanism, which includes the positioning pin 150 and the air cylinder mechanism 142, can be prevented. In other words, because increases in the diameter and weight of the probe head rotation mechanism 100 can be prevented, the measured object to be measured by the probe head rotation mechanism 100 can be increased in size. Also, because the pressing force involved in positioning the rotating body 110 with the air cylinder mechanism 142 is limited to only the axis direction O of the spindle SP, even in a case where displacement of the probe PB occurs during positioning, the displacement can be dealt with simply by correcting the direction of displacement and a high degree of measurement accuracy can be preserved. Moreover, the present invention is not limited to this, and the air cylinder mechanism may instead not be arranged on the opposite side of the axial center O of the spindle SP from the probe.

Also, in the present embodiment, positioning of the rotating body 110 is performed with the positioning pin 150, which includes the ball 150C on its forefront end, and the positioning blocks 130, which each include the pair of circular column members 134. In other words, positioning is performed by contact between the pair of circular column members 134 of the positioning blocks 130 and the ball 150C of the positioning pin 150. Therefore, a positioning mechanism can be configured at a low cost. At this point, the axis direction of the circular column members (also referred to as columns) 134 is identical to the axis direction P of the rotary shaft 118. Therefore, by restricting displacement of the ball 150C using the pair of circular column members 134, highly reproducible positioning of the rotating body 110 can be achieved at a tilt angle defined by the positioning blocks 130. Moreover, the present invention is not limited to this, and the ball may instead be arranged in the positioning block and the pair of circular column members may instead be arranged on the positioning pin.

In addition, in the present embodiment, the positioning pin 150 is supported on the main body frame 101 via the ball spline bearing BS. Therefore, even when displacement of the positioning pin 150 occurs, the positional error from the axial center O of the ball 150C (spindle SP) can be reduced, and thus displacement of the positioning pin 150 can be achieved with a high degree of accuracy. When the positioning pin 150 is supported on the ball spline bearing BS, rotation around the axis is regulated. However, the ball 150C has a shape with rotational symmetry, and engages with the positioning blocks 130. Therefore, there is favorable consistency in joining the positioning pin 150 with the ball spline bearing BS, and attachment/adjustment of the positioning pin 150 can be readily performed. Moreover, the present invention is not limited to this, and the positioning pin may instead be supported on the main body frame via a bearing other than the ball spline bearing.

Furthermore, in the present embodiment, the rotary shaft 118 regulates displacement of the rotating body 110 relative to the axis direction P of the rotary shaft 118 with the large diameter portion 118D and the shims CM1 and CM2. In addition, the pair of bearings BR are fixated to the main body frame 101 by compression in mutually facing directions, and the rotary shaft 118 is supported by the main body frame 101 via the pair of bearings BR. Moreover, the bearings BR are combined angular bearings and can bear an axial load and a radial load in both directions. Therefore, even when the shims CM1 and CM2 are pressed by the bearings BR, play can be minimized. Therefore, fluctuations in position relative to the axial center P of the rotary shaft 118 associated with changes in the tilt angle of the rotating body 110 and fluctuations in position in the axis direction P of the rotary shaft 118 (play in the radial direction) can be dramatically reduced. In other words, positional error of the rotating body 110 arising due to the inclination of the rotating body 110 can be reduced. At this point, the positioning pin 150 is supported by the ball spline bearing BS, and therefore when the tilt angle of the rotating body 110 is determined, play in the radial direction and thrust direction of the rotary shaft 118 can be eliminated and positional error of the rotating body 110 can be reduced. The rotating body 110 and the rotary shaft 118 are separate components, and therefore a higher degree of form accuracy can be preserved for the rotary shaft 118 and, moreover, positional error of the rotating body 110 can be reduced. Furthermore, configurations and arrangements of components necessary to attach the rotating body, the rotary shaft, and the main body frame are not limited to this.

Specifically, in the present embodiment, by reducing an effect on the probe PB of heat generated by the motor 122 due to changing the posture of the probe PB, errors in the defined position of the probe PB can be reduced.

A description of the present invention was given with the first embodiment; however, the present invention is not limited to this embodiment. In other words, improvements and design modifications can, of course, be made to the present invention without departing from the scope of the invention.

For example, in the first embodiment, the probe head rotation mechanism 100 directly supports the probe PB. However, the present invention is not limited to this. For example, a configuration may be used such as that in a second embodiment shown in FIGS. 5 to 8B. In the second embodiment, the primary differences with respect to the first embodiment are in supporting a probe with a probe head rotation mechanism, and in a positioning mechanism, for example. Therefore, configurations other than those addressing supporting a probe with a probe head rotation mechanism, a positioning mechanism, and the like are simply assigned a reference numeral with a different first digit, and descriptions thereof are omitted.

Figure 5:
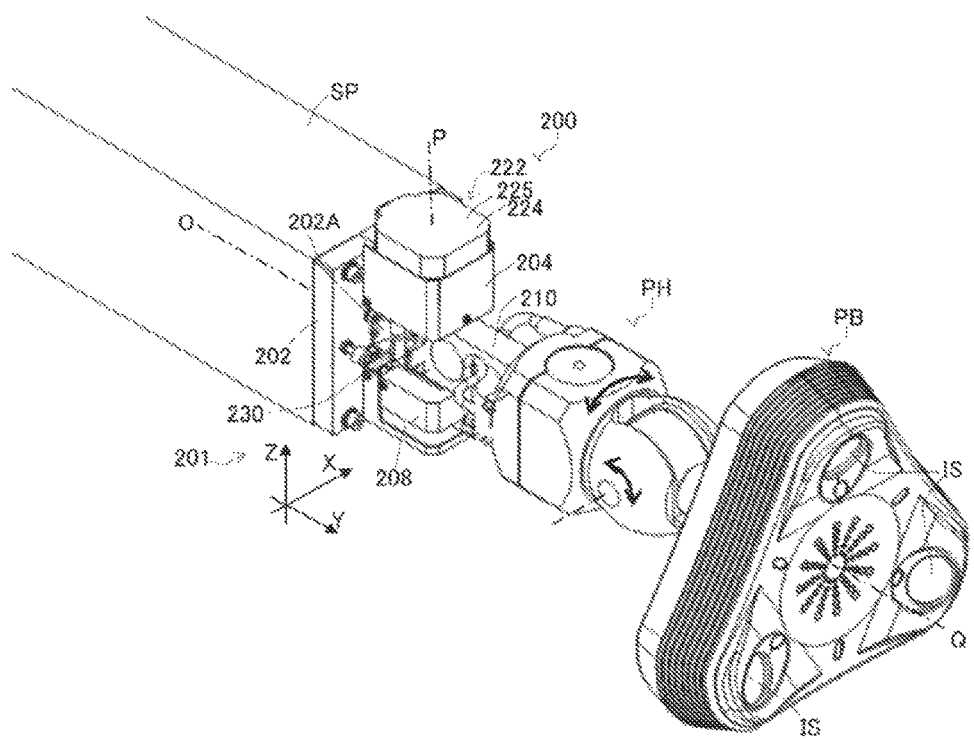
FIG. 5 is a perspective view of an exemplary probe head rotation mechanism according to a second embodiment of the present invention.

As shown in FIG. 5, in the second embodiment, the spindle SP is oriented in the horizontal direction (Y direction), and the axis direction O of the spindle SP is congruent with the Y direction. A probe head rotation mechanism 200 supports the probe PB via a probe head rotation mechanism PH. The probe PB is a non-contact laser probe (having a weight of approximately 500 g, for example). The probe PB includes a line laser fired at the measured object from three directions, and three image capture elements IS detecting the laser. Therefore, the probe PB is able to measure a three-dimensional shape of the measured object with fewer changes to the orientation of the probe PB as compared to a laser probe that includes a single line laser and a single image capture element. Unlike the probe head rotation mechanism 200, the probe head rotation mechanism PH is able to rotate in two axis directions, as shown by two arrows. In this example, the probe head rotation mechanism PH is configured to be motor-driven in two axis directions (having a weight of less than 1 kg, for example), but may instead be configured to manually rotatable.

As shown in FIGS. 7A to 8B, in the probe head rotation mechanism 200, a positioning block 230 configuring a positioning mechanism has a shape where the positioning block 230 forms a recess 232 with inclined side surfaces. In addition, a positioning pin 250 includes, at a forefront end of a rod portion 250A, a wedge-shaped end portion 250B capable of properly fitting together with the recess 232. Moreover, a motor 222 is a support portion 228 integrally provided to a frame body 206 and is supported via a thermal insulation member 226.

Figures 6A, 6B:
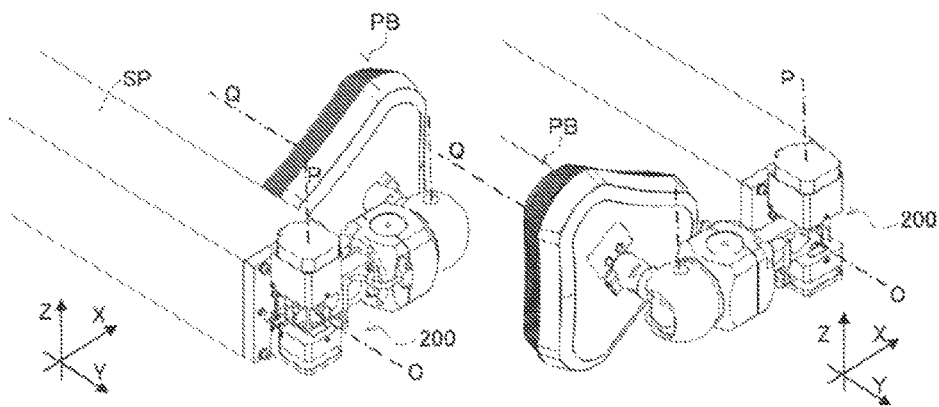
FIGS. 6A and 6B are perspective views of driving the probe head rotation mechanism of FIG. 5 (FIG. 6A shows a movement leftward by 90° and FIG. 6B shows a movement rightward by) 90°.
Figure 7A:
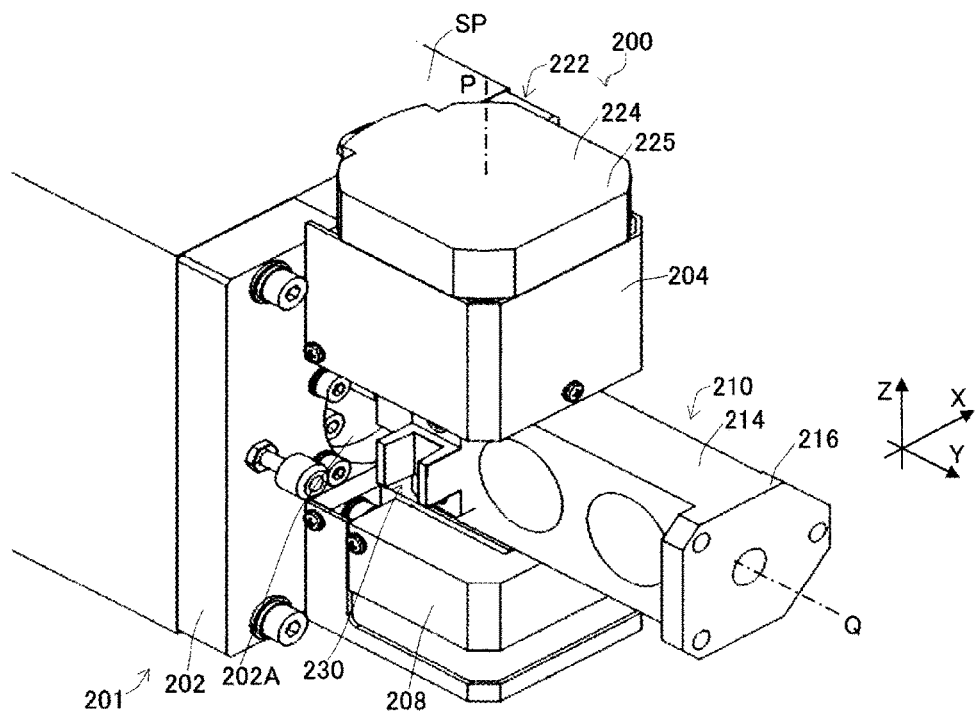
FIGS. 7A and 7B are perspective views of the probe head rotation mechanism of FIG. 5 (FIG. 7A shows a state fixated to a spindle and FIG. 7B shows the probe head rotation mechanism alone)
Figure 7B:
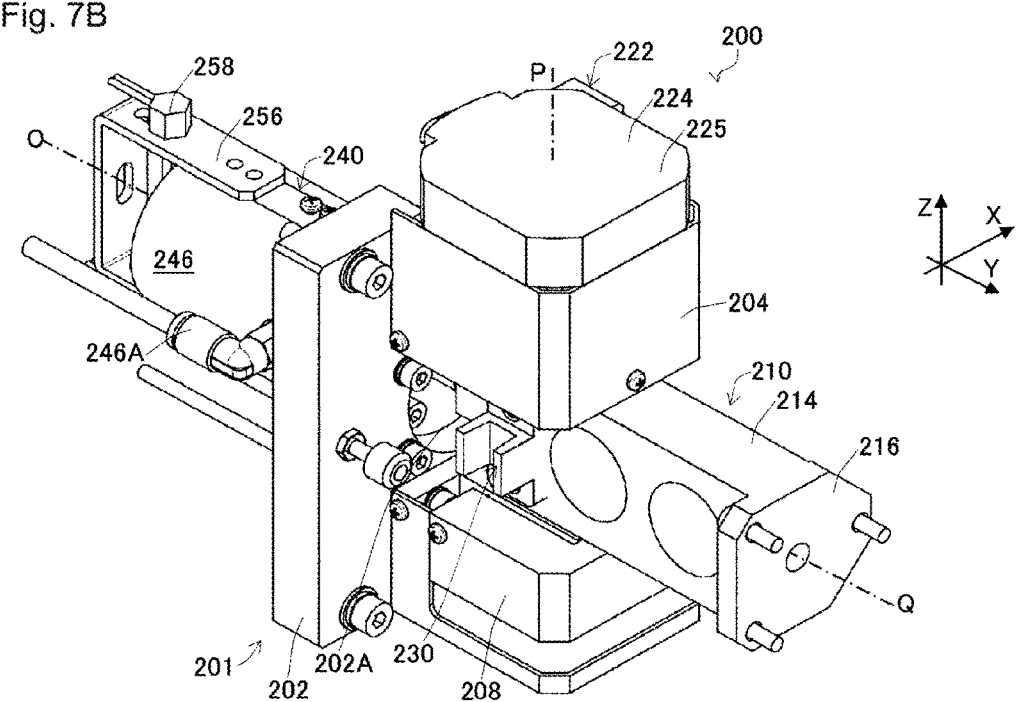
Figure 8A:
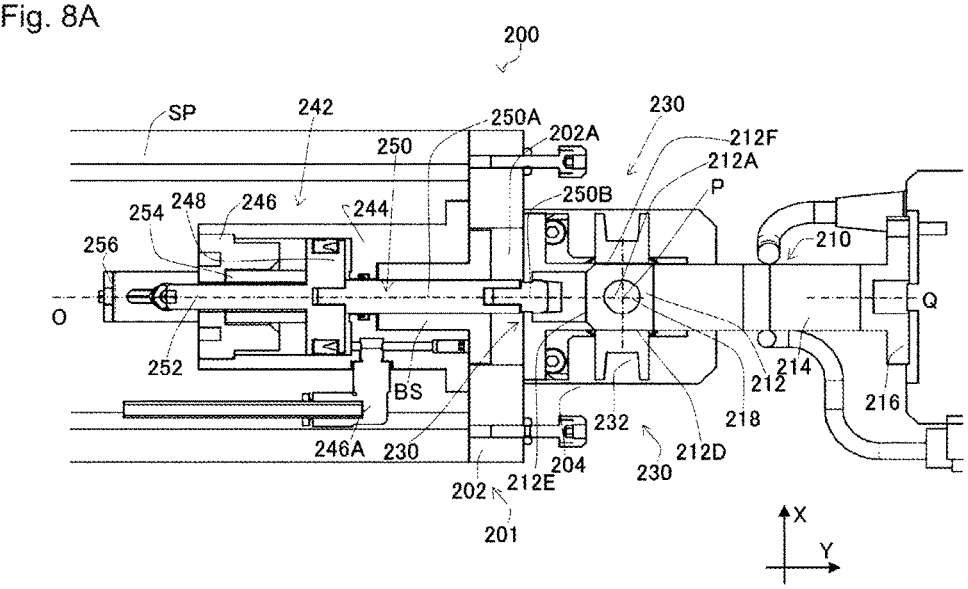
FIGS. 8A and 8B are schematic views of the probe head rotation mechanism of FIG. 5 (FIG. 8A shows a front cross-sectional view and FIG. 8B shows a left cross-sectional view).
Figure 8B:
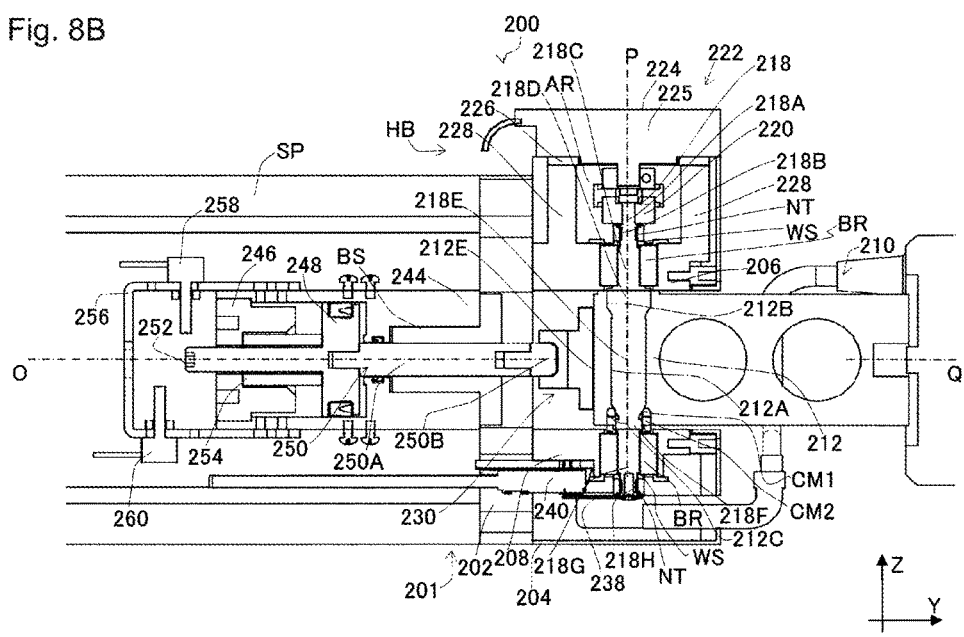

In the present embodiment, and as shown in FIG. 5 for example, unlike the probe head rotation mechanism PH, a motor main body 225 is arranged away from lying on the axial center O of the spindle SP, and a motor casing 224 projects further toward the diameter direction exterior than the spindle SP. Therefore, the probe head rotation mechanism 200 can use a motor 222 that is larger than a motor installed in the probe head rotation mechanism PH. In other words, even in a case where serially connecting and using two or more probe head rotation mechanisms PH is not possible due to motor torque, by using the motor 222 (which has sufficiently large torque) in the probe head rotation mechanism 200, a probe head rotation mechanism PH or probe PB coupled at a later stage can be tilted. Specifically, as shown in FIGS. 6A and 6B, by tilting a rotating body 210 with the probe head rotation mechanism 200, the probe PB can be tilted from a non-inclined initial state to a side 180° opposite. That is, assembly with the probe head rotation mechanism PH can be achieved in practical use, measurement is enabled in a region where measurements could not be performed conventionally, and a degree of freedom of measurement in a coordinate measurement device can be increased. Accordingly, even when a measurement region of the measured object is somewhat toward an interior of the measured object (for example, an interior of a car body), the three-dimensional shape of this region can be measured. Even in a case where an additional probe head rotation mechanism 200 is connected to the probe head rotation mechanism 200, the motor 222 of the base probe head rotation mechanism 200 can be readily swapped out for a larger motor 222 in order to achieve still greater torque.

In addition, in the embodiments described above, the rotating bodies 110 and 210 of the probe head rotation mechanisms 100 and 200 are positioned at only three tilt angles: 0°, −90°, and +90°. However, the present invention is not limited to this and the rotating body may instead be positioned at only two tilt angles, or at four or more tilt angles. In such a case, the tilt angles are not necessarily at equal intervals, and may be defined at any tilt angle.

In addition, in the embodiments described above, the probe head rotation mechanisms 100 and 200 have configurations capable of tilting around one axis (rotary shafts 118 and 218). However, the present invention is not limited to this. For example, a probe head rotation mechanism according to the present invention may instead have a configuration capable of tilting around two axes, as in the probe head rotation mechanism PH.

In addition, in the embodiments described above, the drive source is a motor. However, the present invention is not limited to this. The drive source may instead be an air cylinder. The probe head rotation mechanism according to the present invention may also have a configuration capable of tilting around two axes, as in the probe head rotation mechanism PH.

In addition, in the embodiments described above, when a forefront end of a positioning pin has a spherical shape (wedge shape), the positioning block includes a pair of circular column shapes (a recessed shape). However, the present invention is not limited to this. For example, when the forefront end of the positioning pin has a spherical shape, the positioning block may have a recessed shape or a conical shape.

The present invention can be broadly applied to a probe head rotation mechanism which modifies a posture of a probe in a coordinate measurement device.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A probe head rotation mechanism situated between a spindle and a probe of a coordinate measurement device, the probe head rotation mechanism comprising:
   a main body frame supported by the spindle;
   a rotor supported by the main body frame so as to be tiltable with respect to an axial center of the spindle;
   a drive source supported by the main body frame and configured to drive the rotor, wherein a main body of the drive source is arranged away from lying on the axial center of the spindle, and an axial center of the drive source is oriented outward in a diameter direction of the spindle;
   a drive source casing that houses the main body of the drive source; and
   a heat buffer positioned between the drive source and the rotor and configured to absorb thermal conduction from the drive source to the rotor, the heat buffer including a thermal insulator positioned between the drive source casing and the main body frame and configured to support the drive source casing.

2. The probe head rotation mechanism according to claim 1, wherein the drive source casing projects further outward in the diameter direction than the spindle.

3. The probe head rotation mechanism according to claim 1, wherein the heat buffer includes a layer of air.

4. The probe head rotation mechanism according to claim 1, wherein the heat buffer further comprises a shaft coupling configured to couple a drive shaft of the drive source and a rotary shaft of the rotor.

5. The probe head rotation mechanism according to claim 1, wherein a rotary shaft of the rotor and the axial center of the spindle are further arranged orthogonally to each other.

6. The probe head rotation mechanism according to claim 1 further comprising a support member on the main body frame, and an air cylinder fixed to the support member and configured to position the rotor.

7. The probe head rotation mechanism according to claim 6, wherein the air cylinder is arranged opposite the rotor, on an opposite side of the axial center of the spindle from the probe.

8. The probe head rotation mechanism according to claim 7, wherein:
   the air cylinder includes a cylinder fixed to the main body frame, and a piston fitted into the cylinder and displaceable in the axis direction of the spindle via compressed air introduced into the cylinder,
   the piston includes a positioning pin coupleable to the piston member and displaceable in the axis direction of the spindle, and further includes a ball provided to a forefront end of the positioning pin, and
   the rotor includes a positioning block having a pair of circular columns corresponding to a predetermined tilt angle of the rotor and configured to touch the ball, the circular columns each having an axis direction configured to match an axis direction of the rotary shaft of the rotor.

9. The probe head rotation mechanism according to claim 8, wherein the positioning pin is provided to the piston and is supported by the main body frame via a ball spline bearing.

10. The probe head rotation mechanism according to claim 1, wherein:
    a rotary shaft of the rotor is fitted into a through-hole provided to the rotor and is configured to regulate displacement of the rotor relative to the axis direction of the rotary shaft using a large diameter portion provided at a position corresponding to a first hole end portion of the through-hole and a shim arranged at a position corresponding to a second hole end portion of the through-hole, and
    a pair of bearings positioned on an exterior of the large diameter portion and the shim, respectively, are fixed to the main body frame by applying pressure in mutually facing directions and the rotary shaft is supported by the main body frame via the pair of bearings.

11. A probe head rotation mechanism situated between a spindle and a probe of a coordinate measurement device, the probe head rotation mechanism comprising:
    a main body frame supported by the spindle;
    a rotor supported by the main body frame so as to be tiltable with respect to an axial center of the spindle;
    a drive source supported by the main body frame and configured to drive the rotor,
    a drive source casing that houses the main body of the drive source; and
    a heat buffer positioned between the drive source and the rotor and configured to absorb thermal conduction from the drive source to the rotor, the heat buffer including a thermal insulator positioned between the drive source casing and the main body frame and configured to support the drive source casing;
    wherein the drive source casing projects further outward in the diameter direction than the spindle.

* * * * *